(12) United States Patent
Cain (10) Patent No.: US 9,380,061 B2
(45) Date of Patent: Jun. 28, 2016

(54) SERVICE PROTECTION

(75) Inventor: Harel Cain, Jerusalem (IE)

(73) Assignee: Cisco Technology Inc., San Jose, CA (US)

( * ) Notice: Subject to any disclaimer, the term of this patent is extended or adjusted under 35 U.S.C. 154(b) by 106 days.

(21) Appl. No.: 13/821,139

(22) PCT Filed: Sep. 21, 2011

(86) PCT No.: PCT/IB2011/054135
§ 371 (c)(1),
(2), (4) Date: Apr. 8, 2013

(87) PCT Pub. No.: WO2012/063142
PCT Pub. Date: May 18, 2012

(65) Prior Publication Data
US 2013/0205381 A1    Aug. 8, 2013

(30) Foreign Application Priority Data

Nov. 11, 2010  (GB) .................................. 1019068.4

(51) Int. Cl.
*H04L 29/06* (2006.01)
*G06F 21/31* (2013.01)

(52) U.S. Cl.
CPC ............... *H04L 63/10* (2013.01); *G06F 21/31* (2013.01)

(58) Field of Classification Search
CPC ....... G06F 21/31; H04L 63/08; H04L 63/083; H04L 9/32; H04L 63/0861
USPC ........................................................... 726/7
See application file for complete search history.

(56) References Cited

U.S. PATENT DOCUMENTS 7,006,993 B1 *  2/2006  Cheong .................. G06Q 20/02
                                                            705/35
7,343,014 B2    3/2008  Sovio et al.

(Continued)

FOREIGN PATENT DOCUMENTS

CN          103716793 A  *  4/2014
WO     WO 2013155392 A1  *  10/2013  .............. H04L 43/16

OTHER PUBLICATIONS

Liu Chen-Chung et al."'Tag quality estimation for RFID based on Probability" proceeding, 2010 International Symposium on Computer, Communication, Control and Automation.*

(Continued)

*Primary Examiner* — Ali Abyaneh
*Assistant Examiner* — Sanchit Sarker
(74) *Attorney, Agent, or Firm* — Hahn Loeser & Parks, LLP (57) ABSTRACT

A method and system for determining whether user accounts in a client-server architecture are legitimate is described, the method and system including determining a first integer value, hereinafter denoted N, and a second integer value, hereinafter denoted K, such that K<N, receiving a request at a server from one client device of a plurality of client devices, the request including a unique user identification and a password, the request being a request to access an object, the unique user identification and password being associated with a particular user, sending from the server, at least K times, to one client device of the plurality of client devices a share to be stored in a state object stored on the one client device to which any share is sent on behalf of the server, verifying at the server that one client device of the plurality of client devices has at least K stored shares in the state object, as a positive result of the verifying, flagging in a database that a user account associated with the unique user identification and password received by the server is a legitimate user account, as a negative result of the verifying, and only if at least N−(N/K)+1 shares have been sent, flagging the user account associated with the unique user identification and password received by the server as an illegitimate user account, after sending at least N−(N/K)+1 shares from the server, repeating the sending, determining, and verifying steps. Related methods, systems and hardware are also described.

10 Claims, 4 Drawing Sheets

(56) References Cited

U.S. PATENT DOCUMENTS

| | | | |
|---|---|---|---|
| 7,685,631 B1* | 3/2010 | Paya | H04L 9/3271 726/27 |
| 2002/0049900 A1* | 4/2002 | Patrick | H04L 63/0442 713/151 |
| 2004/0024688 A1* | 2/2004 | Bi | G06F 21/10 705/37 |
| 2005/0044410 A1* | 2/2005 | Yan | G06Q 20/382 726/4 |
| 2005/0108551 A1* | 5/2005 | Toomey | G06F 21/31 713/185 |
| 2005/0132183 A1* | 6/2005 | Gearhart | H04L 63/0428 713/150 |
| 2005/0192686 A1* | 9/2005 | Hirota | G06F 3/16 700/94 |
| 2005/0254514 A1 | 11/2005 | Lynn | |
| 2006/0098795 A1 | 5/2006 | Choti et al. | |
| 2006/0282660 A1 | 12/2006 | Varghese et al. | |
| 2008/0201446 A1* | 8/2008 | Svendsen | G06F 21/10 709/218 |
| 2009/0290713 A1 | 11/2009 | Belenky | |
| 2010/0050274 A1* | 2/2010 | Miki | H04L 63/10 726/29 |
| 2010/0260334 A1* | 10/2010 | Obana | H04L 9/085 380/28 |
| 2010/0281537 A1* | 11/2010 | Wang | G06F 9/468 726/22 |
| 2011/0138454 A1* | 6/2011 | Mansour | H04L 9/3218 726/9 |
| 2012/0084833 A1* | 4/2012 | Thomas | G06F 17/30867 726/3 |
| 2012/0278475 A1* | 11/2012 | Papakipos | G06Q 10/10 709/224 |
| 2013/0205381 A1* | 8/2013 | Cain | H04L 63/10 726/7 |
| 2013/0275582 A1* | 10/2013 | Gedam | H04L 43/16 709/224 |

OTHER PUBLICATIONS

Adi Shamir, "How to share a secret," Communication of the ACM, vol. 22, No. 11, pp. 612-613 (Nov. 1979).*

Feb. 22, 2012 Transmittal of International Search Report and Written Opinion of International Searching Authority for PCT/IB2011/054135.

Mar. 11, 2011 Office Communication in connection with prosecution of GB 1019068.4.

Mar. 9, 2013 Office Communication in connection with prosecution of GB 1019068.4.

Liu Chen-Chung et al., "Tag quantity estimation for RFID based on probability," *Proceedings, 2010 International Symposium on Computer, Communication, Control and Automation*.

Amos Fiat et al., "Dynamic Traitor Tracing" (Dept. of Computer Science, School of Mathematical Sciences, Tel Aviv University, Tel Aviv, Israel).

Adi Shamir, "How to share a secret," *Communications of the ACM*, vol. 22, No. 11, pp. 612-613 (Nov 1979).

"Pigeonhole Principle," *Wikipedia* (Jan. 12, 2012).

* cited by examiner

SERVICE PROTECTION

RELATED APPLICATIONS

The present application is a 35 U.S.C. §371 application of PCT/IB2011/054135, filed on 21 Sep. 2011 and entitled "Service Protection", which was published in the English language with International Publication No. WO 2012/063142, and which claims the benefit of priority from GB Patent Application GB 1019068.4 of NDS Limited, filed 11 Nov. 2010.

FIELD OF THE INVENTION

The present invention relates in general to online services and particularly, but not exclusively, to user accounts in online services.

BACKGROUND OF THE INVENTION

The following patents, patent applications, and non-patent literature are believed to reflect the state of the art:
  US 2009/0290713 of Belenky;
  US 2006/0282660 of Varghese, et al;
  US 2006/0098795 of Choti, et al;
  US 2005/0254514 of Lynn;
  U.S. Pat. No. 7,343,014 to Sovio, et al;
  How to Share a Secret, Adi Shamir, Communications of the ACM, Volume 22, Number 11, November 1979, which is available on the Internet at portal.acm.org/citation.cfm?doid=359168.359176; and
  A discussion of the pigeonhole principle (also known as Dirichlet's box principle) of mathematics is available on the Internet at en.wikipedia.org/wiki/Pigeonhole_principle.

SUMMARY OF THE INVENTION

The present invention, in certain embodiments thereof, seeks to provide an improved method and system for service protection of online services by prevention of password mass distribution.

There is thus provided in accordance with an embodiment of the present invention a method for determining whether user accounts in a client-server architecture are legitimate, the method including determining a first integer value, hereinafter denoted N, and a second integer value, hereinafter denoted K, such that K<N, receiving a request at a server from one client device of a plurality of client devices, the request including a unique user identification and a password, the request being a request to access an object, the unique user identification and password being associated with a particular user, sending from the server, at least K times, to one client device of the plurality of client devices a share to be stored in a state object stored on any one client device to which the share is sent on behalf of the server, verifying at the server that one client device of the plurality of client devices has at least K stored shares in the state object, as a positive result of the verifying, flagging in a database that a user account associated with the unique user identification and password received by the server is a legitimate user account, as a negative result of the verifying, and only if at least N−(N/K)+1 shares have been sent, flagging the user account associated with the unique user identification and password received by the server as an illegitimate user account, after sending at least N−(N/K)+1 shares from the server, repeating the sending, determining, and verifying steps.

Further in accordance with an embodiment of the present invention after at least K shares have been sent, the verifying is performed each time the sending step is performed.

Still further in accordance with an embodiment of the present invention no more than N/K client devices may request an object from the server.

Additionally in accordance with an embodiment of the present invention a sanction is applied to the user account flagged as a illegitimate user account.

Moreover in accordance with an embodiment of the present invention a benefit is provided to the user account flagged as a legitimate user account.

Further in accordance with an embodiment of the present invention the requested object includes one of a content object, a service, and an item requiring a requester to provide valid credentials to access.

Still further in accordance with an embodiment of the present invention the received request from the client device includes at least one of a HTTP_GET call, a login to the server, a request for content, a request for a service, a page turn request, and a play command for viewing video content.

Additionally in accordance with an embodiment of the present invention the shares include a shared secret.

Moreover in accordance with an embodiment of the present invention the one client device verified as having at least K stored shares is identified as a primary client device for the user associated with the unique user identification and password received by the server from the client device.

Further in accordance with an embodiment of the present invention the state object includes an encrypted state object.

Still further in accordance with an embodiment of the present invention the state object includes a cookie.

There is also provided in accordance with another embodiment of the present invention a system for determining whether user accounts in a client-server architecture are legitimate, the method including a first integer value, hereinafter denoted N, and a second integer value, hereinafter denoted K, such that K<N, a request receiver disposed at a server operative to receive a request from one client device of a plurality of client devices, the request including a unique user identification and a password, the request being a request to access an object, the unique user identification and password being associated with a particular user, a share sender disposed at the server operative to send, at least K times, to one client device of the plurality of client devices a share to be stored in a state object stored on the one client device to which any share is sent on behalf of the server, a verifier disposed at the server operative to verify that one client device of the plurality of client devices has at least K stored shares in the state object, a processor disposed at the server operative to flag in a database as a positive result of the verifying that a user account associated with the unique user identification and password received by the server is a legitimate user account, the processer operative to flag in the database as a negative result of the verifying, and only if at least N−(N/K)+1 shares have been sent the user account associated with the unique user identification and password received by the server as an illegitimate user account, after sending at least N−(N/K)+1 shares from the server, the server repeating the sending, determining, and verifying steps.

BRIEF DESCRIPTION OF THE DRAWINGS

The present invention will be understood and appreciated more fully from the following detailed description, taken in conjunction with the drawings in which.

DETAILED DESCRIPTION OF AN EMBODIMENT

Figure 1:
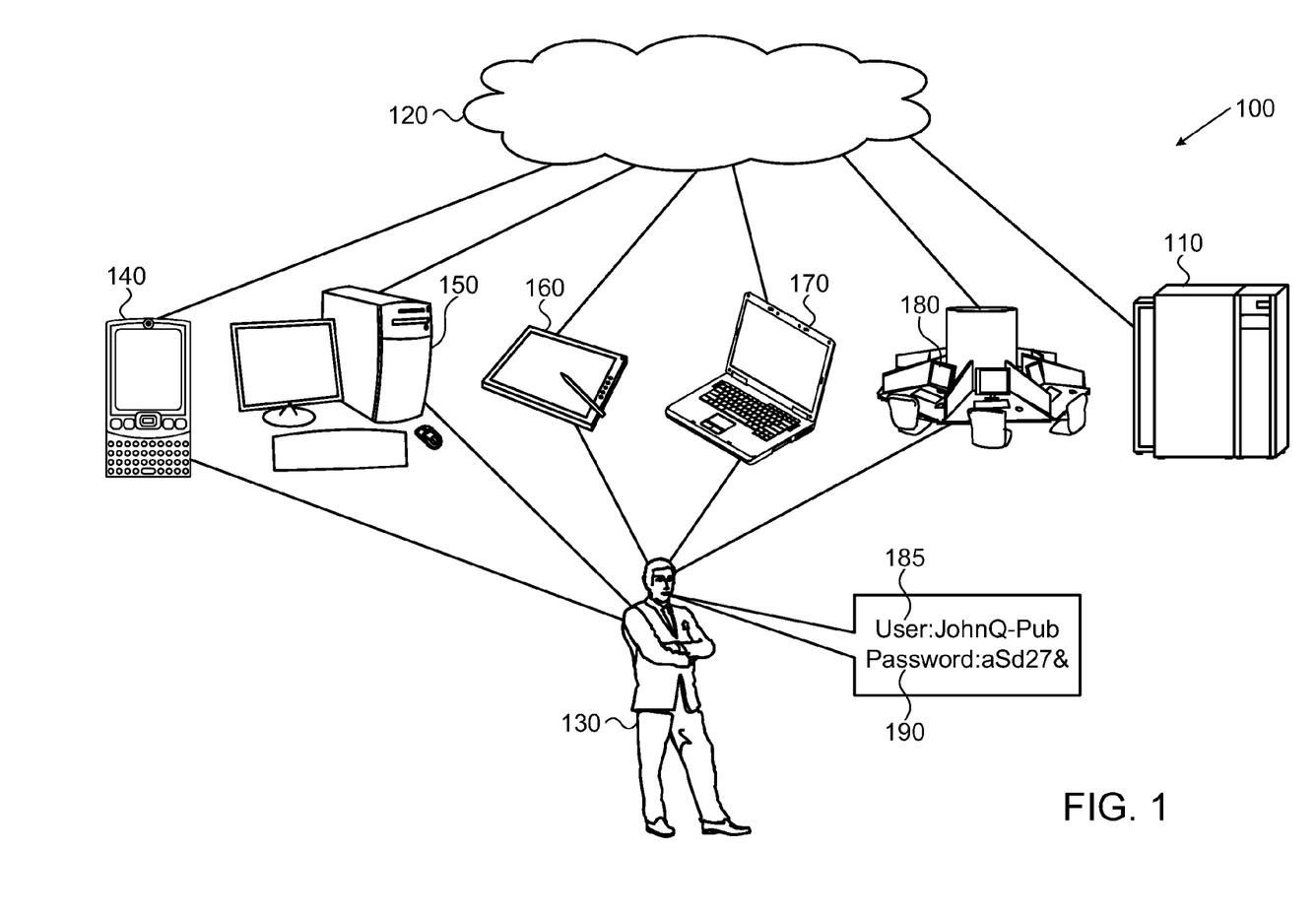
FIG. 1 is a simplified pictorial illustration of a system for protection of an online service, the online service used by a legitimate user account, constructed and operative in accordance with an embodiment of the present invention.

Reference is now made to FIG. 1, which is a simplified pictorial illustration of a system for protection of an online service, the online service used by a legitimate user account, constructed and operative in accordance with an embodiment of the present invention. The system 100 of FIG. 1 comprises a server 110 which is in communication with various client devices (which are discussed below). The server 110 receives requests for a service, or for content, or for any other item which requires a requester to provide valid credentials in order to gain access to the item. The server then dispatches the service, the content, or the requested item over a network, such as, but not limited to, the Internet 120. As will be discussed below, the present invention, in embodiments thereof comprises a method and system, using the pigeonhole principle, to determine whether or not a subscriber account is a legitimate subscriber account, and thus, entitled (or not) to receive content dispatched from the server 110. It is appreciated that, although the server 110 is depicted in FIG. 1 (and later in FIG. 2) as a mainframe computer, in fact, any appropriate computing device which is operating as a server on a network may, in fact, be the server 110 of the system of FIG. 1.

A variety of client devices may be used by a single subscriber 130 of a service in order to connect, over the Internet 120, in order request access to the service or the content available on the server 110. It is appreciated that although the Internet 120 is described as the network over which the client devices are communicating with the server 110, any appropriate network (such as, for example, and without limiting the generality of the foregoing, an intranet, a cable or satellite television network, a wide area network, a metropolitan area network, or so forth) may be the network used in the various embodiments of the present invention.

In FIG. 1, by way of a non-limiting example, client devices depicted include a smart phone 140, a desktop computer 150, a tablet computer 160, a laptop computer 170, and a console 180 at an Internet café, airport lounge, or other public place from where the subscriber 130 may connect to the server 110 using a publicly available computing device.

The subscriber 130 has a user name 185, by which he identifies himself to the server 110. In the present example, the user name 185 is depicted as being JohnQ-Pub. The subscriber 130 also has a password 190, depicted as aSd27&. The user name 185 may be any unique user identification known to the subscriber 130 and the server 110. The user name 185 uniquely identifies the subscriber 130 to the server 110, as is well known in the art. The user name 185 is associated with a password 190, the password 190 serving as a shared secret enabling the server 110 to verify that the subscriber 130, with the user name 185 JohnQ-Pub, knows the shared secret associated with the user name 185 JohnQ-Pub, namely the password 190 aSd27&, and therefore, it is reasonable for the server 110 to assume that the person entering the user name 185 is, in fact, a legitimate subscriber to the service provided by the server 110.

Those skilled in the art will appreciate that typically, a server does not store a password in the clear, but, rather, the server stores a hash digest of the password to be stored. When the subscriber 130 attempts to log in to the server 110, the server 110 typically compares a hash of the entered password with the stored hash digest of the password. Assuming that the stored hash digest matches the hash of the entered password, the subscriber 130 is allowed access to the server 110.

Figure 2:
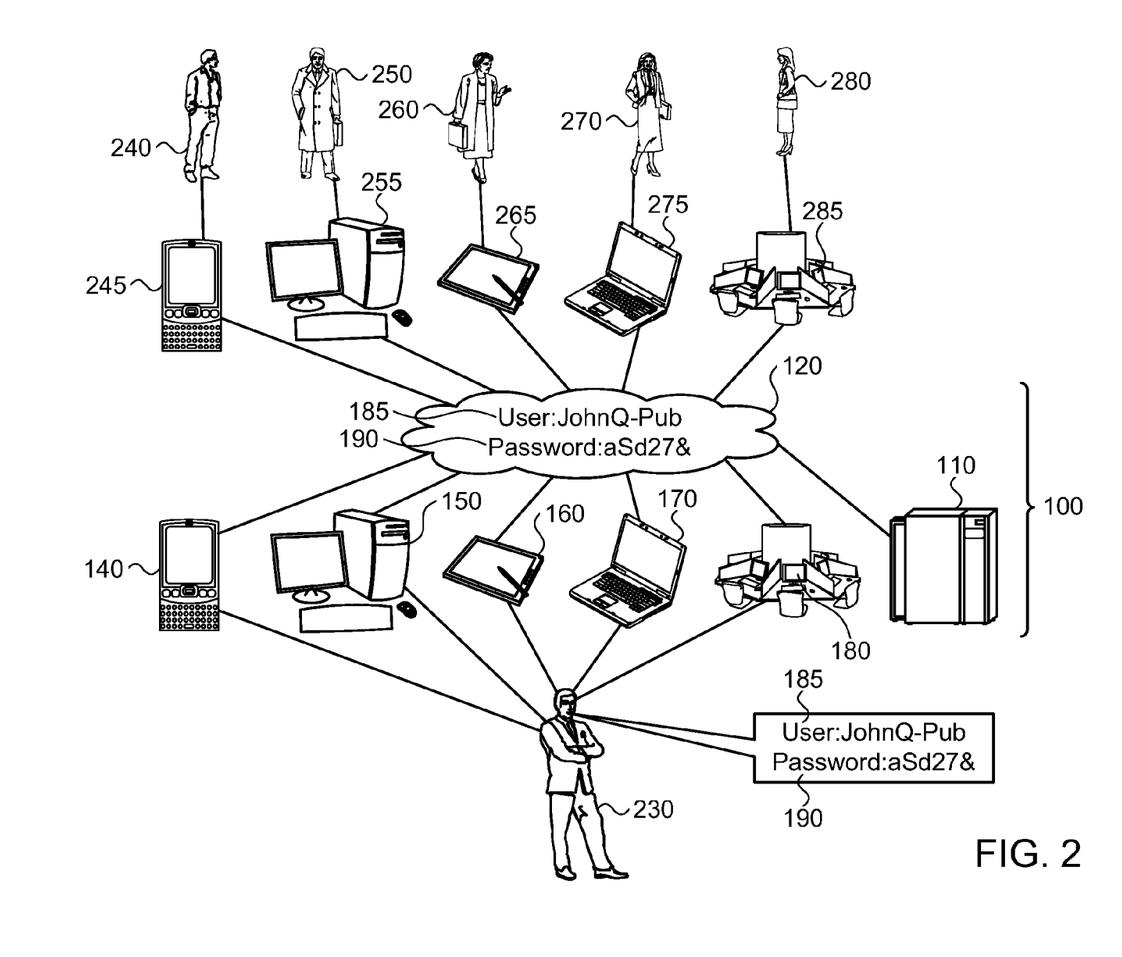
FIG. 2 is a simplified pictorial illustration of the system of FIG. 1, wherein the online service is used by an illegitimate user account.

By way of contrast, reference is now additionally made to FIG. 2, which is a simplified pictorial illustration of the system of FIG. 1, wherein the online service is used by an illegitimate user account. The system 100 of FIG. 1 is reproduced in FIG. 2, at the bottom portion of the figure. However, in place of the subscriber 130 which, in FIG. 1, depicts a legitimate subscriber, the subscriber depicted in FIG. 2 is depicted as an illegitimate subscriber 230. In the embodiment of the system of FIG. 1 which is depicted in FIG. 2, the user name 185, JohnQ-Pub and the password 190, aSd27& are available on the Internet. For example and without limiting the generality of the foregoing, a password can be posted at a bulletin-board site, on a forum or on a mailing list accessible to only authorized members (such as some well known hacker forums). As such, other users 240, 250, 260, 270, 280 are able to connect to the server 110 from their respective devices 245, 255, 265, 275, 285, and request that the server 110 provide them the service or the content. However, as these other users 240, 250, 260, 270, 280 are obtaining the user name 185 and password 190 over the Internet, and not through a legitimate subscription, these other users 240, 250, 260, 270, 280 are illegitimate subscribers, and as such, are not actually entitled to access the service or the content provided by the server 110.

Figure 3:
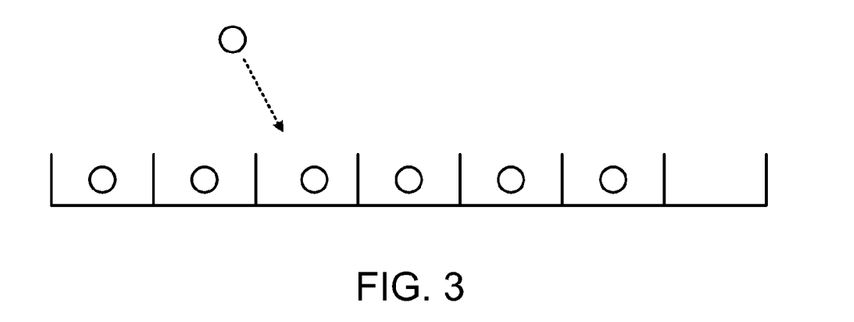
FIG. 3 is a simplified line drawing depicting the pigeonhole principle, provided for the discussion of the systems of FIGS. 1-2.

Reference is now additionally made to FIG. 3, which is a simplified line drawing depicting the pigeonhole principle, provided for the discussion of the systems of FIGS. 1-2. The pigeonhole principle states that to put p items into q pigeonholes, where p>q, then, at least one pigeonhole must contain at least more than one item. (Technically, in the generalized example of p items into q pigeonholes, p−q items must be sharing a pigeonhole with at least one other item. In FIG. 3, seven 'pigeonholes' are depicted (i.e. q=7), each one already containing an item. An eighth item is now being dropped (i.e. p=8), so that into whichever pigeonhole the eighth item drops, that pigeonhole will end up with two items.

Figure 4A:
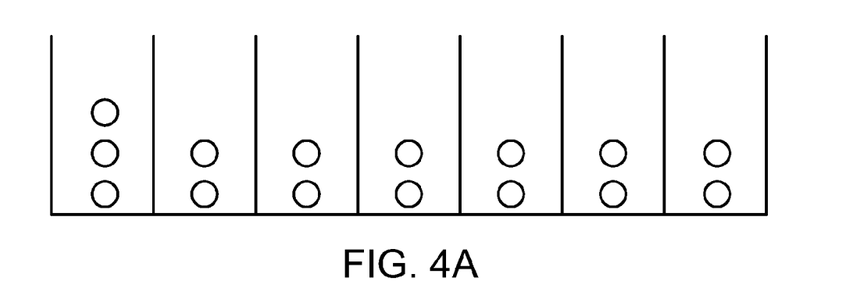
FIG. 4A is a simplified line drawing depicting a conceptualized example of a legitimate user account within the system of FIG. 1.
Figure 4B:
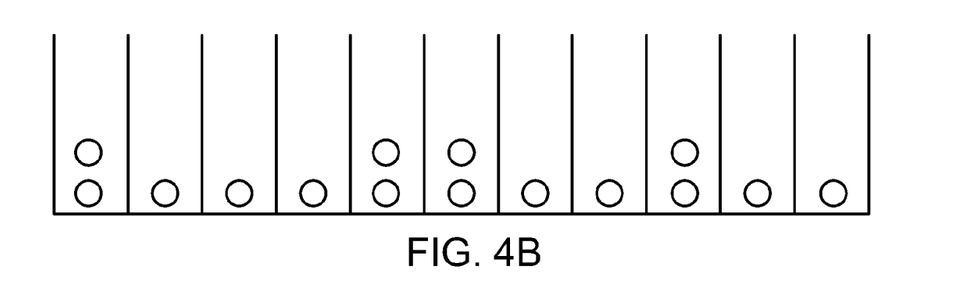
FIG. 4B is a simplified line drawing depicting a conceptualized example of an illegitimate user account within the system of FIG. 2.

The operation of the system of FIG. 1 (and by contrast, FIG. 2) is now described with reference additionally made to FIG. 4A and by contrast, FIG. 4B. FIG. 4A is a simplified line drawing depicting a conceptualized example of a legitimate user account within the system of FIG. 1. FIG. 4B is a simplified line drawing depicting an example of a conceptualized illegitimate user account within the system of FIG. 2. A first integer value, denoted hereinafter as N, is chosen. A second integer value, denoted hereinafter as K, is also chosen, such that K<N. Additionally, N/K is an upper bound limiting a maximum number of devices (such as the smart phone 140, the desktop computer 150, the tablet computer 160, the laptop computer 170, and the console 180 at an Internet café, airport lounge, or other public place) from which the subscriber 130 may connect to the server 110 using a computing device. N and K may be global constants for all users and accounts on the server, or they may be determined subject to the agreement of the server owner or content provider and the subscriber 130 or user of the server.

It is appreciated that if N/K is not an integer, it cannot be an upper bound itself. In such a case, the upper bound would be floor(N/K) where floor is the well known function which maps a real number to the largest previous integer.

The maximum number of devices from which the subscriber 130 may connect to the server 110 is enforced relative to (or within) a time period that is dependent on N and on K. The maximum number of devices is not a permanent number of maximum devices.

Each subscriber 130 with a username 185 and password 190 is entitled to log into an account on the server 110 and request the service or the content. A legitimate subscriber is defined as a subscriber 130 which satisfies either one of the following criteria:

1. The subscriber 130 connects to the server from at most N/K devices; and
2. The subscriber 130 connects to the server at least K/N of the time from one of the subscriber's devices, that is to say, the subscriber's primary device. For example and without limiting the generality of the foregoing, in the list of devices above, the subscriber 130 may connect to the server at least K/N times from the laptop 170. Those skilled in the art will appreciate that criterion 1 implies criterion 2.

By contrast, an illegitimate subscriber 230 is defined as a subscriber which does not satisfy criterion 2 above (namely, the illegitimate subscriber 230 does not connect to the server at least K/N of the time from only one of the devices). For example and without limiting the generality of the foregoing, an illegitimate subscriber 230 has mass-distributed the username 185 and password 190 (which are depicted as being available on the Internet 120 in FIG. 2). Such an illegitimate subscriber 230 typically fails to satisfy criterion 2 above.

Whenever a subscriber (either a legitimate subscriber 130 or an illegitimate subscriber 230, 240, 250, 260, 270, or 280) performs a connection event to the server 130 the subscriber (either a legitimate subscriber 130 or an illegitimate subscriber 230, 240, 250, 260, 270, or 280) is provided a share to be stored in a state object stored on the client device (such as the smart phone 140, the desktop computer 150, the tablet computer 160, the laptop computer 170, and the console 180 at an Internet café, airport lounge, or other public place) from which the subscriber performed the connection event.

The connection event may comprise one of a HTTP_GET call; a login to the server 110; a request for content from the server 110; and a page turn request; a play command for viewing video content; or another appropriate connection event. The state object may comprise a cookie, such as are well known in the Internet environment. Alternatively, the state object may comprise any other object to which the server 110 has both read and write privileges on the client device.

It is also appreciated that the share may be distributed not at every connection event, but rather, at a given number of connection events. For example and without limiting the generality of the foregoing, the share may be distributed only every 9 connection events out of 10 connection events, or the share may be distributed only every 7 connection events out of 8 connection events, and so forth.

The share may be: a share of a secret (as per How to Share a Secret, Adi Shamir, Communications of the ACM, Volume 22, Number 11, November 1979); unique to each individual subscriber 130; or, the state object may comprise a counter which is incremented upon each connection event; or any other appropriate mechanism by which the server 110 is able to indicate that the client device has been a client device from which a connection event was initiated on the server 110.

In some embodiments of the present invention the state object may be stored on the client device in an encrypted form, being encrypted by the server 110 with a symmetric key known only to the server 110. If the state object is stored on the client device in an encrypted form, then such encrypted storage will obstruct users of a distributed password from also distributing the shares received from the server among themselves. Alternatively, if the share comprises a counter comprised in the state object, then such encrypted storage will obstruct users of a distributed password from tampering with the value of the counter.

Applying the pigeonhole principle, as explained above, with reference to FIG. 3, by the time N−(N/K)+1 of a total of N shares have been distributed by the server, then:

1. A legitimate subscriber 130 will have accumulated K of the shares on one device belonging to the legitimate subscriber 130 (for instance, the laptop 170 of FIG. 1 will have accumulated the bulk of the distributed shares). This state is symbolically depicted in FIG. 4A, where the bulk of the circles are located in one of the 'pigeonholes'.
2. An illegitimate subscriber 230 will typically not have accumulated K of the shares on any of the illegitimate subscriber's 230 devices (for instance, none of the devices 245, 255, 265, 275, 285 of FIG. 2 will have accumulated the bulk of the distributed shares).

For example, if N=21 and K=3, then, the legitimate subscriber 130 is allowed to connect to the server 110 from N/K=21/3=7 devices within a given timeframe. Alternatively, the legitimate subscriber 130 is allowed to connect to the server 110 from more than the 7 devices, if at least ⅓ of the connections of legitimate subscriber 130 is from one of the devices. Thus, it is expected that at least one out every 7 connections performed by the legitimate subscriber 130 will be performed by a single device among the 7 devices from which the legitimate subscriber 130 is permitted to connect to the server 110. Turning now to FIG. 4A, and viewing each of the 'pigeonholes' in FIG. 4A as one of the devices 140, 150, 160, 170, 180 of the legitimate subscriber 130 there are a total of 7 possible devices (i.e. 'pigeonholes') depicted. Viewing each circle depicted as one of the shares distributed by the server 110, there are 15 shares (i.e. N−(N/K)+1=15) already distributed. The leftmost 'pigeonhole' has 3 shares, and as was noted above, by the time N−(N/K)+1 of a total of N shares have been distributed by the server (that is, in the present example, 21−(21/3)+1=21−7+1=15 shares), then a legitimate subscriber 130 will have accumulated K (i.e. 3) of the shares on one of the devices of the legitimate subscriber 130. Since the leftmost 'pigeonhole' of FIG. 4A has 3 shares, then the subscriber whose devices are represented by the 7 'pigeonholes' of FIG. 4A is a legitimate subscriber.

On the other hand, turning to FIG. 4B by contrast, there is no device ('pigeonhole') which has three shares. Thus, if at least 15 shares (as explained above) have been distributed by the server 110, then it follows that the subscriber associated with the username and password in the case of FIG. 4B is an illegitimate subscriber 230.

Once the server 110 has distributed at least K shares, then, after each connection event the server 110 examines the state object stored on the client device. If the server determines that there exists one client device having at least K shares, the server flags the account associated with the subscriber in a subscriber database as an account associated with a legitimate subscriber. On the other hand, once the server 110 has distributed at least N−(N/K)+1 shares, if the server determines that one client device having at least K shares does not exist, the server flags the account associated with the subscriber in a subscriber database as an account associated with an illegitimate subscriber.

Typically, once the server 110 has sent at least N−(N/K)+1 shares, the server 110 'zeros' the counter of the number of shares sent out, and restarts the cycle of:
- sending out shares;
- determining that at least K shares have been sent out;
- finding a client device with at least K shares (typically this is checked for after each share is sent out after the $K^{th}$ share is sent out); and
- flagging the subscriber account associated with the found client device as a legitimate subscriber's account (or, upon determining that no such client device exists, flagging the subscriber account as an illegitimate subscriber's account).

Those skilled in the art will appreciate that a subscriber account which is marked at least once as a legitimate account may be given a benefit in return for their not mass-distributing the username 185 and password 190. Such benefits may include, but are not limited to entitling the subscriber account owner to discounts, free merchandise or downloads, and other prizes, as is known in the art. Alternatively, a subscriber account which is marked at least once as an illegitimate account may be sanctioned in various ways which are known in the art. For example and without limiting the generality of the foregoing, someone attempting to login to the server 110 with the username 185 and password 190 associated with such an account may be required to call a customer service center, or they may be required to change either or both of the username and password. In extreme cases, they may be banned from logging on to the server 110 or prosecuted. Additionally, sanctions can include modifying N and K for such an account, such that N/K is decreased.

Those skilled in the art will appreciate that the method and system of FIG. 1 may be subject to at least two potential attacks.

Potential Attack 1

The Attack: The threshold that is sought to establish a legitimate subscriber 130 (that is, K shares) can be artificially established by repeated logins, possibly with the help of a script. The strength of such an attack is that the attack can be carried out independently by users and illegitimate subscribers 230 who share the password.

Countermeasure: Frequent logins from the same IP address can be limited. For instance, a new share may be distributed by the server 110 to a device logging in from an IP address from which the device has already logged in only if a time threshold has passed. Alternatively, a device may only be allowed to log in from the same IP address as its last login only after first logging in from a second IP address.

It is appreciated that it is quite easy to modify the exact IP address when connecting to an ISP (for instance by using a IP renew request to a DHCP server). However, in that a range and geographic location are typically fixed and constant when connecting to the ISP, it is possible to compare the service provider, range, and geographic location.

Discussion of Attack 1: When the system of FIG. 1 operates with large enough values of N and K, attack 1 becomes inconvenient, as it would force any subscriber (such as illegitimate subscriber 230) who is massively sharing his account credentials (i.e. user name 185 and password 190) but still wishing to reach the required number of shares, K, mandated by the system to repeatedly login and then logout.

If this repeated logging in and logging out is performed manually, then, for example logging in and out 50 times in a row becomes very tedious, beyond what a normal user would be willing to do to gain access to online content. If this repeated logging in and logging out is performed automatically, then other users (such as illegitimate subscribers 240, 250, 260, 270, and 280) sharing the account credentials (i.e. user name 185 and password 190) will very likely also be using similar automated scripts, to the effect that if even two of them are repeating this procedure at overlapping times, they will not reach the required number of K shares out of N−(N/K)+1, hence the system of FIG. 1 remains effective.

Potential Attack 2

The Attack: The robustness of the embodiments of the present invention discussed herein assumes that the state objects are not shared. This attack calls for sharing of the state objects along with the password. Note that the fact that the state objects is encrypted does not help against this attack (e.g. if there is a common encryption key or the encryption key itself is shared).

Countermeasure: The state object may store the IP addresses for every login. The information about the ISP and geographic location can be used to identify if the logins occur from a (somewhat) static computer. Note that most laptops (which are transient by nature) also have one or two points of connection that are used most often (e.g. office, home). A frequent change in IP addresses would give a strong indication for a shared state object.

Discussion of Attack 2: The robustness of the embodiments of the present invention assumes that the state objects are not shared. Effective sharing of the state objects to circumvent the system would require nearly all illegitimate subscribers (such as illegitimate subscribers 240, 250, 260, 270, and 280) who received the account credentials (i.e. user name 185 and password 190) to repeatedly post their latest state object and then always synchronize to the latest state object published. If these criteria are not met, then sharing the state object is not effective and the illegitimate subscribers will still not be able to meet the K shares out of N−(N/K)+1 criterion.

Furthermore, sharing a state object online is an operation that requires cumbersome manual action on the part of the subscribers after every login, or else the use of special browser add-ins which are not typically mandated by the content provider, and are thus not necessarily in use by the subscribers sharing the account. The bother of constantly sharing and synchronizing state objects is a large effective deterrent, and forcing a large (massive) group of subscribers sharing an account to willfully go through this nuisance is unrealistic.

Keeping track of IP addresses in the state object is a possible option, but in embodiments of the present invention this is not required, and the same device can connect from multiple, even sporadic, IP addresses as long as those IP addresses do not massively share their account credentials.

Figure 5:
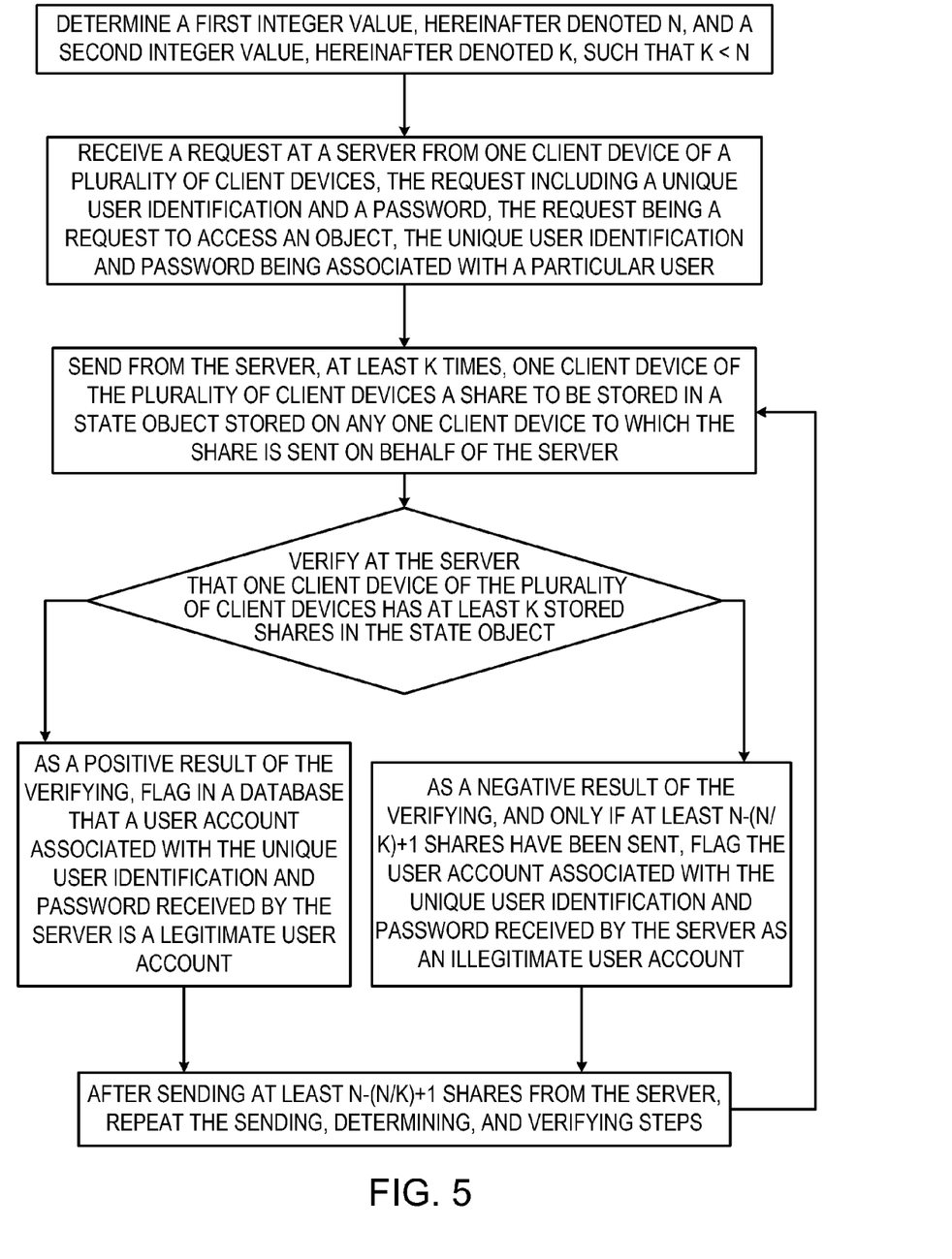
FIG. 5 is a simplified flowchart diagram of a method of operation of the system of FIG. 1.

Reference is now made to FIG. 5, which is a simplified flowchart diagram of preferred methods of operation of the system of FIG. 1. The method of FIG. 5 is believed to be self explanatory in light of the above discussion.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product; on a tangible medium; or as a signal interpretable by an appropriate computer.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A method for determining whether user accounts in a client-server architecture are legitimate, the method comprising:
   determining a first integer value, hereinafter denoted N, and a second integer value, hereinafter denoted K, such that 1<K<N;
   performing, by the server, the following steps, while the server is connected to a plurality of client devices ranging from at least two client devices to at most floor (N/K) client devices, the client devices associated with a particular user and at least K/N connections of the particular user connections to the server are from one client device, wherein the at most floor (N/K) client devices comprises a maximum number of client devices connectable to the server within a predetermined time period:
   (a) receiving a request at the server from one of the plurality of client devices, the request including a unique user identification and a password, the request being a request to access an object, the unique user identification and password being associated with an account associated with the particular user;
   (b) providing a share to be stored in a state object to the one of the plurality of client devices, in response to the request, wherein the state object comprises an object received from the server to which the server has both read and write privileges;
   (c) after sending the share from the server, at least K times, to the plurality of client devices associated with the account associated with the particular user, and prior to sending at least N-floor(N/K)+1 shares from the server, verifying at the server that one client device of the plurality of client devices has at least K stored shares in the state object;
   as a positive result of the verifying, flagging in a database that the account associated with the particular user associated with the unique user identification and password received by the server is a legitimate user account;
   as a negative result of the verifying, flagging the account associated with the particular user associated with the unique user identification and password received by the server as an illegitimate user account;
   repeating steps (a)-(c) at least once after sending at least N-floor(N/K)+1 shares from the server, wherein the server zeros a counter of a number of shares sent prior to the repeating.

2. The method according to claim 1 and wherein no more than floor(N/K) client devices may request an object from the server.

3. The method according to claim 1 and wherein a sanction is applied to the account associated with the particular user flagged as an illegitimate user account.

4. The method according to claim 1 and wherein a benefit is provided to the account associated with the particular user flagged as a legitimate user account.

5. The method according to claim 1 and wherein the requested object comprises one of a content object; a service; and an item requiring a requester to provide valid credentials to access.

6. The method according to claim 1 and wherein the received request from the client device comprises at least one of: a HTTP_GET call; a login to the server; a request for content; a request for a service; a page turn request; and a play command for viewing video content.

7. The method according to claim 1 and wherein the share to be stored in a state object comprises a shared secret.

8. The method according to claim 1 and wherein the one client device verified as having at least K stored shares is identified as a primary client device for the user associated with the unique user identification and password received by the server from the client device.

9. The method according to claim 1 and wherein the state object comprises an encrypted state object.

10. The method according to claim 1 and wherein the state object comprises a cookie.

* * * * *